(12) United States Patent
Preipke et al.

(10) Patent No.: US 6,604,347 B2
(45) Date of Patent: *Aug. 12, 2003

(54) ENERGY ABSORBER FOR HUBS OF AGRICULTURAL DISC DRIVE

(75) Inventors: Edward H. Preipke, Lancaster, PA (US); Imants Ekis, Leola, PA (US); Timothy J. Kraus, Hendrick, IA (US)

(73) Assignee: New Holland North America, Inc., New Holland, PA (US)

( * ) Notice: Subject to any disclaimer, the term of this patent is extended or adjusted under 35 U.S.C. 154(b) by 1 day.

This patent is subject to a terminal disclaimer.

(21) Appl. No.: 10/106,740

(22) Filed: Mar. 26, 2002

(65) Prior Publication Data

US 2002/0157366 A1 Oct. 31, 2002

Related U.S. Application Data

(63) Continuation-in-part of application No. 09/844,756, filed on Apr. 27, 2001, now Pat. No. 6,502,377.

(51) Int. Cl.⁷ .............................. A01D 69/10; F16D 9/06
(52) U.S. Cl. ................ 56/6; 56/10.3; 56/11.3; 192/18 R; 192/223
(58) Field of Search .................. 56/6, 10.2 R, 10.3, 56/10.2 J, 10.8, 11.3, 12.7, 13.5, 13.6, 157, 255, 269, 295, DIG. 6; 192/148, 233, 56.55, 18 R; 464/30, 32

(56) References Cited

U.S. PATENT DOCUMENTS

| | | | |
|---|---|---|---|
| 2,056,785 A | 10/1936 | Hanna | 464/32 |
| 3,064,454 A | 11/1962 | Sharples | 464/32 |
| 3,521,464 A | 7/1970 | Kidby | 464/32 |
| 3,827,259 A * | 8/1974 | Brucker | 464/31 |
| 4,226,313 A * | 10/1980 | Meldahl et al. | 192/18 R |
| 4,287,975 A * | 9/1981 | Tuzson | 192/82 T |
| 4,313,293 A * | 2/1982 | Nagai | 56/11.3 |
| 4,322,935 A * | 4/1982 | Poehlman | 56/11.3 |
| 4,333,303 A * | 6/1982 | Plamper | 56/11.3 |
| 4,351,424 A * | 9/1982 | Lawrence et al. | 192/18 R |
| 4,497,161 A | 2/1985 | Vissers et al. | 56/13.6 |
| 4,667,786 A * | 5/1987 | Sato et al. | 192/17 R |
| 4,730,710 A * | 3/1988 | Granitz | 192/18 R |
| 4,815,262 A | 3/1989 | Koch, et al. | 56/13.6 |
| 4,996,783 A * | 3/1991 | Fresia | 37/245 |
| 4,999,981 A | 3/1991 | Neuerburg | 56/6 |
| 5,033,595 A * | 7/1991 | Pardee | 192/18 R |
| 5,293,731 A * | 3/1994 | Thomas et al. | 56/11.3 |
| 5,715,662 A | 2/1998 | Walters | 56/6 |
| 5,761,890 A | 6/1998 | Lehman et al. | 56/6 |

* cited by examiner

Primary Examiner—Robert E. Pezzuto
Assistant Examiner—Nathan Mammen
(74) Attorney, Agent, or Firm—John William Stader; A. Nicholas Trausch; Rebecca L. Henkel

(57) ABSTRACT

A disc cutterbar with at least one cutterhead having a two-piece mounting hub, one piece rotatably driven and the other supporting a knife for severing standing crop material, with an epoxy layer bonding the two pieces together and forming a shear device therebetween. A brake is associated with the knife-supporting piece whereby upon failure of the shear device, the knife-supporting piece is stopped from rotating within one revolution. The brake includes upper and lower locking blocks having generally mating teeth. Upon failure of the shear device, the teeth of the upper and lower locking blocks engage, thereby stopping the rotation of the mounting hub.

20 Claims, 11 Drawing Sheets

ENERGY ABSORBER FOR HUBS OF AGRICULTURAL DISC DRIVE

CROSS-REFERENCE TO RELATED APPLICATIONS

This application relates to U.S. patent application Ser. No. 09/845,112 filed on Apr. 27, 2001, now U.S. Pat. No. 6,487,835, and entitled "Overload Protection for Disc Cutterbar" in the names of Timothy J. Kraus and Imants Ekis, and is a Continuation-in-Part of co-pending U.S. patent application Ser. No. 09/844,756 filed on Apr. 27, 2001 now U.S. Pat. No. 6,502,377, and entitled "Brake for a Disc Cutterbar" in the name of Timothy J. Kraus.

FIELD OF THE INVENTION

The present invention relates generally to mechanisms for protecting mechanical drive components from overloads, and more particularly relates to a shear device and brake coupled between components of an agricultural disc mower that protects the various components of the mower in the event a cutterhead strikes an object and creates an overload condition.

BACKGROUND OF THE INVENTION

Typical disc cutterbars used in agriculture include an elongated housing containing a train of meshed idler and drive spur gears, or a main power shaft coupled by respective bevel gear sets, for delivering power to respective drive shafts for cutterheads spaced along the length of the cutterbar. The cutterheads each comprise a cutting disc including diametrically opposed cutting blades (though configurations with three or more blades are known) and having a hub coupled to an upper end of a drive shaft, the lower end of the drive shaft carrying a spur gear in the case where a train of meshed spur gears is used for delivering power, and carrying a bevel gear of a given one of the bevel gear sets in the case where a main power shaft is used. In either case, bearings are used to support the various shafts. The cutterheads are rotated at a relatively fast speed making the drive components, such as gears, bearings and shafts, vulnerable to damage in the event that the unit strikes a foreign object. For background information on the structure and operation of some typical disc cutterbars, reference is made to U.S. Pat. No. 4,815,262, issued to E. E. Koch and F. F. Voler, the descriptive portions thereof being incorporated herein in full by reference.

In order to minimize the extent of such possible damage to the drive components, it is known to incorporate a shear device somewhere in the drive of each unit that will "fail" upon a predetermined overload being imposed on the device. As used herein with reference to shear devices, the terms "fail" or "failing" are intended to cover the actual function of such devices, i.e., shearing, fracturing, breaking and the like. Several different such shear devices and arrangements are shown in U.S. Pat. Nos. 4,999,981, 4,497, 161 and 5,715,662.

The '981 patent shows a shear mechanism that comprises a shaft with a weakened portion created by a cut groove, or break zone 41 (seen, for example, in FIG. 3 thereof) in driven shaft 20. Upon overload, the shaft breaks at zone 41 that is located outside the support bearing such that there is a clean and complete break in the shaft. This structure is intended to eliminate the input of kinetic energy to the cutterhead after failure of the shear mechanism, thereby eliminating damage to the drive system and gearing. While this structure may in fact eliminate the input of further kinetic energy, it does not stop rotation of the cutterhead or prevent the damage that continued rotation would generate.

A somewhat different shear mechanism is disclosed in FIGS. 2 and 3 of the '161 patent. Cutting disc 3 is connected by a series of shear bolts 26 to the vertical shaft 8. Upon impact of the cutterhead with an obstruction, the shear bolts fail, stopping the input of rotational force to the cutterhead. FIG. 4 shows a slightly different embodiment where a resilient cover plate 28 depresses balls 30 arranged in holes of the disc 3 and fitting into recesses 31 of the disc 27. An overload impact is intended to cause balls 30 to snap out of the recesses 31 so that the direct rotary joint between shaft 8 and cutting disc 3 is interrupted. It is stated that the connection can be re-established by continuing to rotate disc 3 with respect to the disc 27 so that the balls 30 again snap into the recesses 31. The embodiments set forth in this patent exhibit the same shortcomings as seen in the '981 patent, i.e., standard shear mechanisms do not stop rotation of the cutterhead, and thus do not prevent additional damage thereby encountered.

The shear mechanisms shown in the '662 patent each employ shearable splines. A first embodiment the shear device is in the form of either a collar or clamping member having internal splines received on a splined upper end of the drive shaft and having shearable cylindrical drive lugs engaged with complementary shaped openings provided in an upper surface of a disk hub. Referring more specifically to FIG. 2 thereof, the upper end of drive shaft 26 has a splined section 86. Shear collar 88 establishes a drive connection between shaft 2i6 and hub 80. The collar 88 includes internal splines 90 engaged with the splined section 86 of shaft 26 just above hub 80. Shearable cylindrical drive lugs 92 project downwardly from the bottom of collar 88 and are received in complementary holes 94 in hub 80. An overload situation causes the lugs 92 to shear and the continuing transfer of rotational power to cease. FIGS. 4 through 6 shows another embodiment where shaft 34 has a splined upper end section 110. Instead of a shear collar, a shear device in the form of a cap-like clamping member 114 is used for transferring torque from shaft 34 to hub 80. Clamping member 114 has an annular lower portion 116 provided with interior splines 118 engaged with the splined section 110 of shaft 34. A plurality of shearable lugs 120 extend downward from lower portion 116 and are received in complementary shaped cylindrical openings 94 in hub 80, whereby torque is transferred from shaft 34 to hub 80. Again, when an overload occurs, lugs 120 shear, and torque is no longer transmitted. The final embodiment shown in the '662 patent is shown in FIGS. 7 through 9. Instead of a disk hub 80, a disk hub 127 is used which has a central splined opening 128 disposed in spaced concentric relationship t the splined upper end section 110 of shaft 34. A ring-like shear insert 130 is received on the upper end of the drive shaft 34 and has inner splines 132 engaged with the splined upper end section of the shaft and has outer splines 134 engaged with the splined opening 128 of hub 126. Splines 132 are designed to shear upon overload.

Similar to the other prior art discussed above, the embodiments of the '662 patent do not stop the cutterhead from rotating, even after power is cut off by a shear device. The third embodiment shown in this patent exhibits an additional shortcoming in that upon failure of the shearable splines, the broken pieces tend to become temporarily "jammed" in among the other parts and components, resulting in even further, though short lived, torque to be transferred, and the resultant additional damage to the cutterheads.

Particularly in its preferred embodiment, the invention disclosed in the parent application hereof overcomes the drawbacks and shortcomings of the prior art. A two-piece hub design, with an epoxy shear surface therebetween will fail with substantially no residual transfer of torque. In fact, this shear mechanism results in no discernable residue, and is easily repaired by merely adding new epoxy. Upon failure, the two-piece hub, one of which is driven directly by a drive shaft, separates and the non-driven portion engages a braking mechanism that stops rotation of the cutterhead, i.e., the non-driven portion of the hub.

The instant invention is an improvement over the devices disclosed and claimed in the parent application, and is the result of the observation that excessive shear forces can damage the hubs of the parent disclosure, thereby allowing the outer hub to continue to rotate and stop in an undesirable position allowing the disc cutterhead to be struck by the adjacent disc cutterheads.

While the concept of a shear mechanism other than shear pins, lugs or bolts is not new, the use of a frangible layer such as epoxy in the environment of a cutterbar is new and provides advantages in overcoming the problems and shortcomings of the prior art as discussed above. In order to limit the damage to a cutterbar in an overload situation, two characteristics are pursued—a quick, clean disengagement of the driven elements, and a rapid end of rotation of the cutterhead. The epoxy layer provides the first, and the novel brake the second. For non-traditional shear mechanisms, attention is directed to U.S. Pat. Nos. 2,056,785 (rubber), 3,064,454 (solder, glass, and other fracturable and fusible materials), and 3,521,464 (plastic).

SUMMARY OF THE INVENTION

Accordingly, one object of the present invention is to provide a brake, operating in conjunction with a shear mechanism, in a mechanical drive train for an agricultural cutterbar that will not only stop the transfer of power along the drive train in the event of overload, but also stop rotation of the non-driven components before further damage can occur.

A further object of the present invention is to provide an energy absorbing locking device that, once the cutterhead engages an obstacle, dissipates the rotational energy of the disc as it deforms, reducing the peak force applied to locking block teeth, eliminating damage to the cutterbar.

Yet another object of the present invention is to provide a disc cutterbar with multiple cutterheads, each comprising a drive shaft connected to an inner hub that is connected to an outer hub via a shear mechanism A novel brake mechanism is triggered upon failure of the shear mechanism, forcing the outer hub downwardly as the energy absorbing material is forced into a cavity, resulting in a more positive engagement of the two hubs.

It is yet a further object of this invention to provide an improved disc cutterbar that is relatively durable in construction, inexpensive of manufacture, carefree of maintenance, easy to assemble, simple and effective in use, and less likely than prior art cutterbars to sustain costly damage upon contact with a fixed object.

These and other objects, features and advantages are accomplished according to the instant invention by providing a disc cutterbar having a two-piece mounting hub, one piece rotatably driven and the other supporting a knife for severing standing crop material, with a shear device between the two pieces, such as an epoxy layer bonding the two pieces together. A brake is associated with the knife-supporting piece whereby upon failure of said shear device, the knife-supporting piece is stopped from rotating within one revolution.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Figure 1:
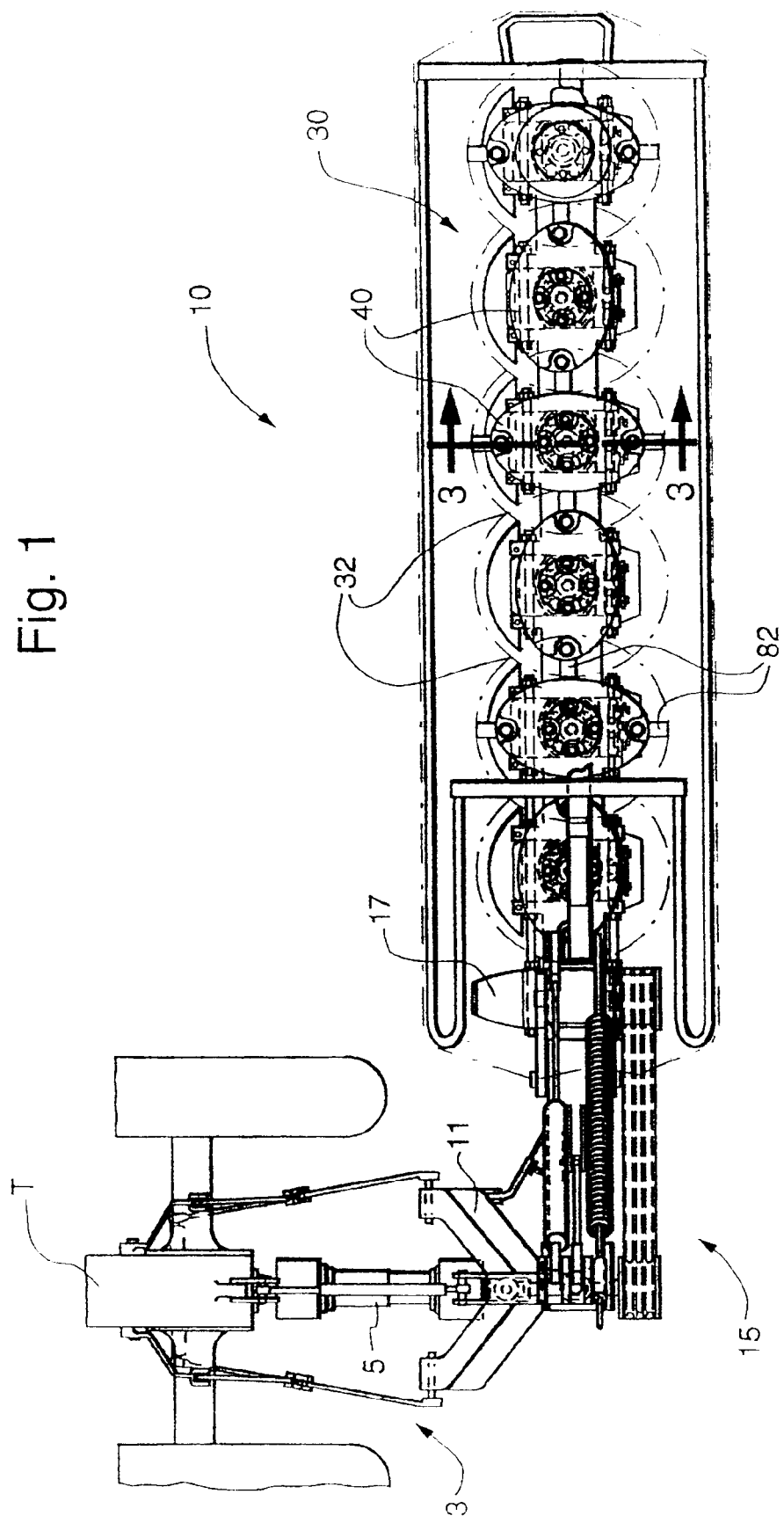
FIG. 1 is a top plan view of a disc mower mounted on the three-point hitch of a tractor, the disc mower having a modular disc cutterbar incorporating the principles of the parent application of this Continuation-in-Part, the rotational path of the individual disc members being shown in phantom, the disc mower being one of the configurations in which the improved disc cutterbar of the instant invention can be utilized.

Referring now to the drawings and particularly to FIG. 1, a modular disc cutterbar incorporating the principles of the parent application can best be seen in a configuration in which the disc cutterbar is conventionally utilized. For a more detailed description of a conventional modular disc cutterbar and various configurations thereof reference is made to U.S. Pat. No. 5,996,323. The disclosure in that patent is hereby incorporated herein in its entirety by reference.

Cutterbar 30 is mounted in a disc mower 10 having a support frame 11 connected to the three-point hitch mechanism 3 of a tractor T on which the mower 10 is carried in a conventional manner. The disc mower 10 receives operative power from the conventional tractor power take-off shaft 5. The mower drive mechanism 15 receives the rotational power from shaft 5 and transfers the rotational power to a gearbox 17, which in turn transfers the rotational power to the cutterbar drive mechanism.

An alternative configuration for the disc cutterbar would be to incorporate the cutterbar in a disc mower-conditioner. This well-known configuration is shown in more detail in U.S. Pat. No. 5,761,890, which is hereby incorporated herein in its entirety by reference. One skilled in the art and knowledgeable about commercial applications of disc cutterbars will readily recognize that there are other specific configurations of cutterbars to which the invention to be disclosed herein will be applicable. Such skilled individual will also readily recognize that the cutterbar need not necessarily be modular in construction.

Figure 2:
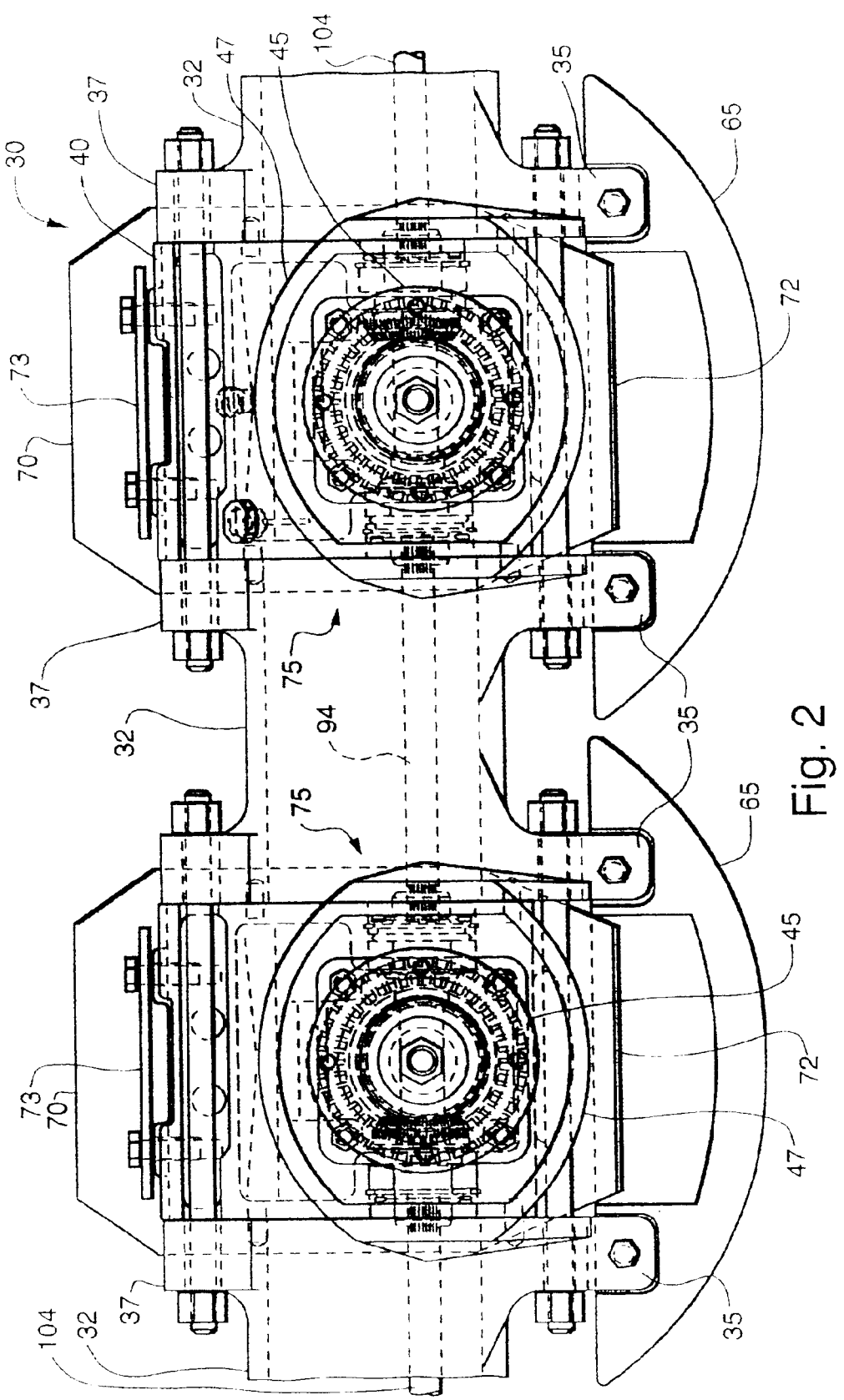
FIG. 2 is an enlarged top plan view of a central portion of the assembled modular disc cutterbar shown in FIG. 1 depicting two cutterhead modules and an interstitial spacer module, portions of the spacer modules on opposite sides of the cutterhead modules being broken away and the disc members being removed for clarity.
Figure 3:
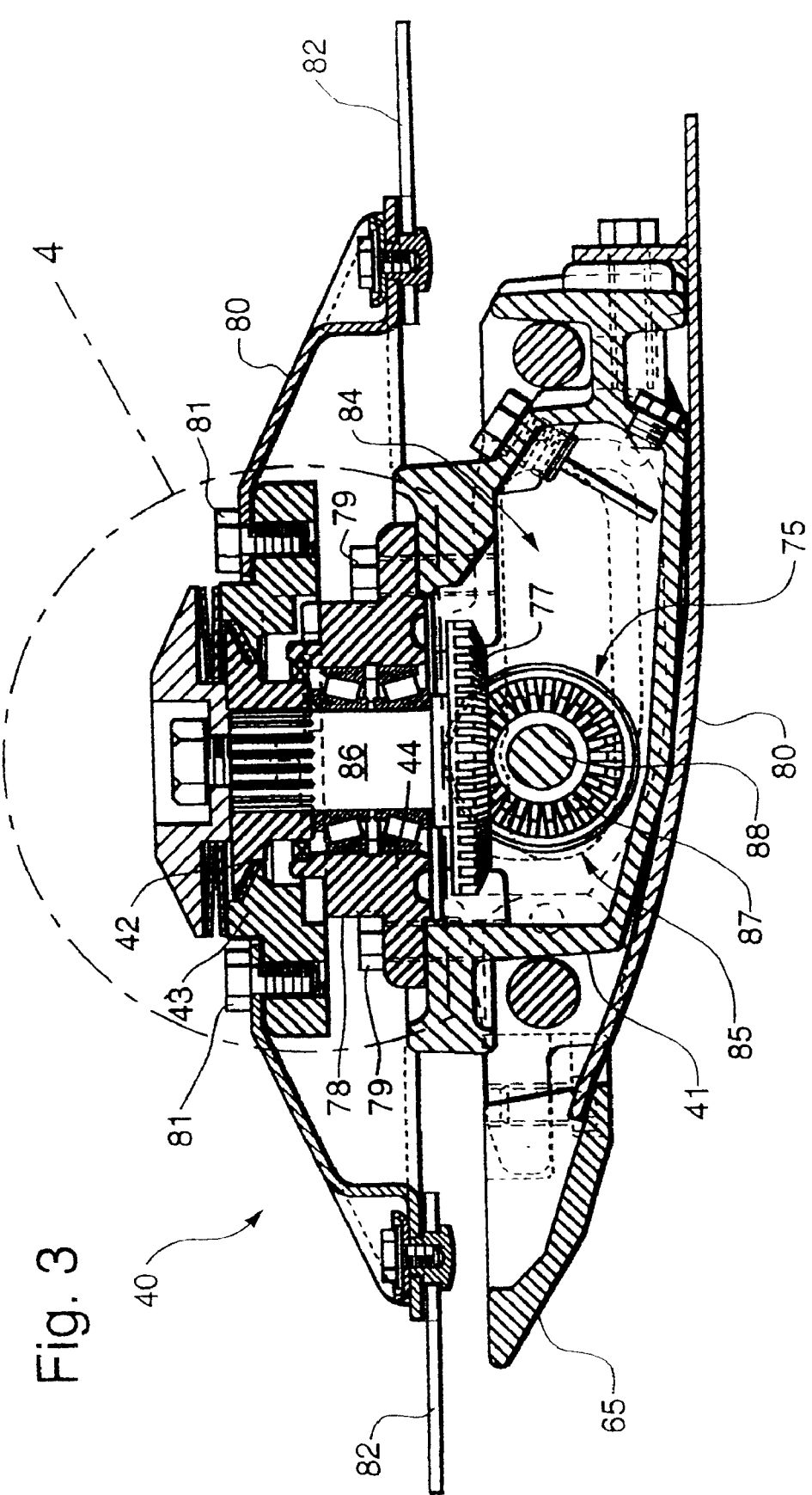
FIG. 3 is a cross-sectional view of the cutterhead module taken along line 3—3 of FIG. 1.

Modular cutterbar 30 is formed from alternating cutterhead modules 40 and spacer modules 32. Each cutterhead module 40, as best seen in FIGS. 1–3, includes a hollow cast housing 41 (FIG. 3) having a shape to retain a low profile and to establish an oil reservoir 84 therewithin. As will be discussed in more detail below, the cutterheads 40 are gear driven and assembled in such a manner as to establish a specific timing relationship between adjacent units. More particularly, the cutterheads are arranged such that the knives 82 on adjacent units have overlapping cutting paths, but do not come into contact with each other. Failure to maintain this timed relationship during operation will result in one unit hitting the adjacent unit(s), damaging the cutterheads (and possibly initiating a chain reaction that damages all cutterheads), the drive train of the cutterbar and/or tractor T. In such case, the damage is usually significant.

Figure 4:
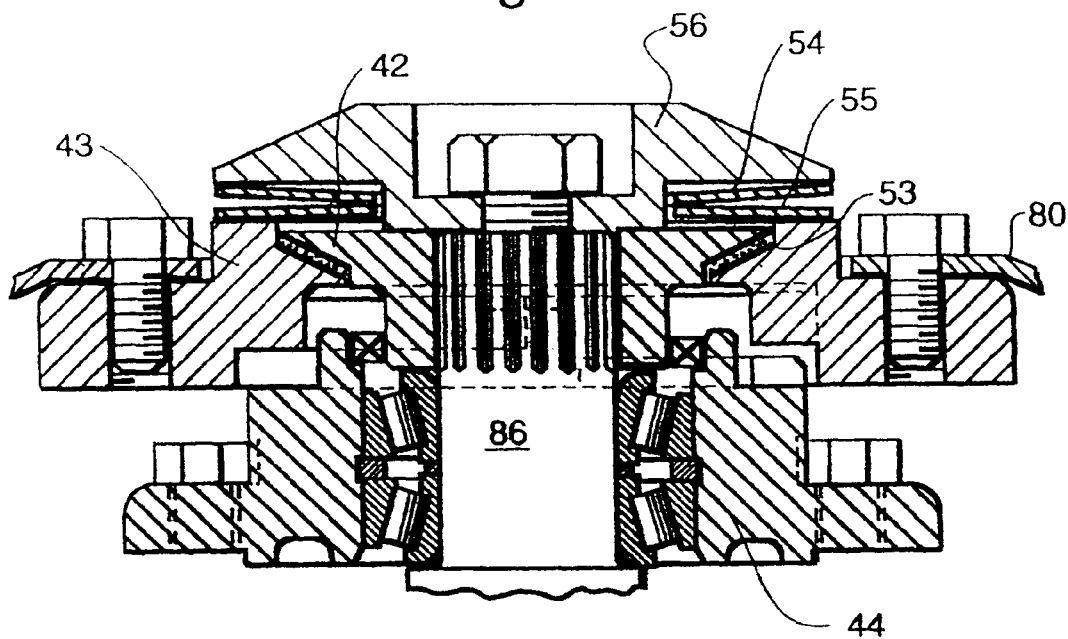
FIG. 4 is an enlarged view of a portion of FIG. 3.

Referring now to FIGS. 2–4, it can be seen that each cutterhead module 40 is provided with a forwardly positioned rock guard 65 and a skid shoe 70 that passes beneath cutterhead module 40 for engagement with the surface of the ground. The rock guard 65 has a conventional semi-circular configuration and is mounted to opposing forward mounting arms 35 of spacer module 32 adjacent to the corresponding cutterhead module 40.

One skid shoe 70 is mounted beneath each cutterhead module 40 to protect the cutterhead module from wear due to engagement with the surface of the ground. Each skid shoe is formed as a generally planar body portion 71 with a mounting tab 73 affixed thereto and projecting upwardly. The body portion 71 is also formed with a forward end 72 that is bent upwardly to engage the corresponding rock guard 65.

Modular drive mechanism 75, seen in FIGS. 2 and 3, is fully disclosed in the '323 patent and reference is made thereto for a more complete description.

Broadly, within each cutterhead unit there is a two-piece hub, one inner hub and one outer hub, normally held together by a shear mechanism. The inner hub is connected to a drive shaft, and the outer hub, including an integral upper locking block, is connected to a rotatable knife support member. Spaced below the outer hub is a fixed lower locking block. These components are arranged such that when a knife engages a solid or fixed object and a shear force generated adequate to cause the shear mechanism to fail, the outer hub rotates freely and drops (preferably under the influence of a downward biased spring) causing the upper and lower locking blocks to engage and the knife support member to cease rotation. By thus preventing the knives from rotating further, damage is prevented to the drive train of the cutterbar and between adjacent cutterhead units. Ideally, the brake will stop rotation in one revolution or less.

Figure 9:
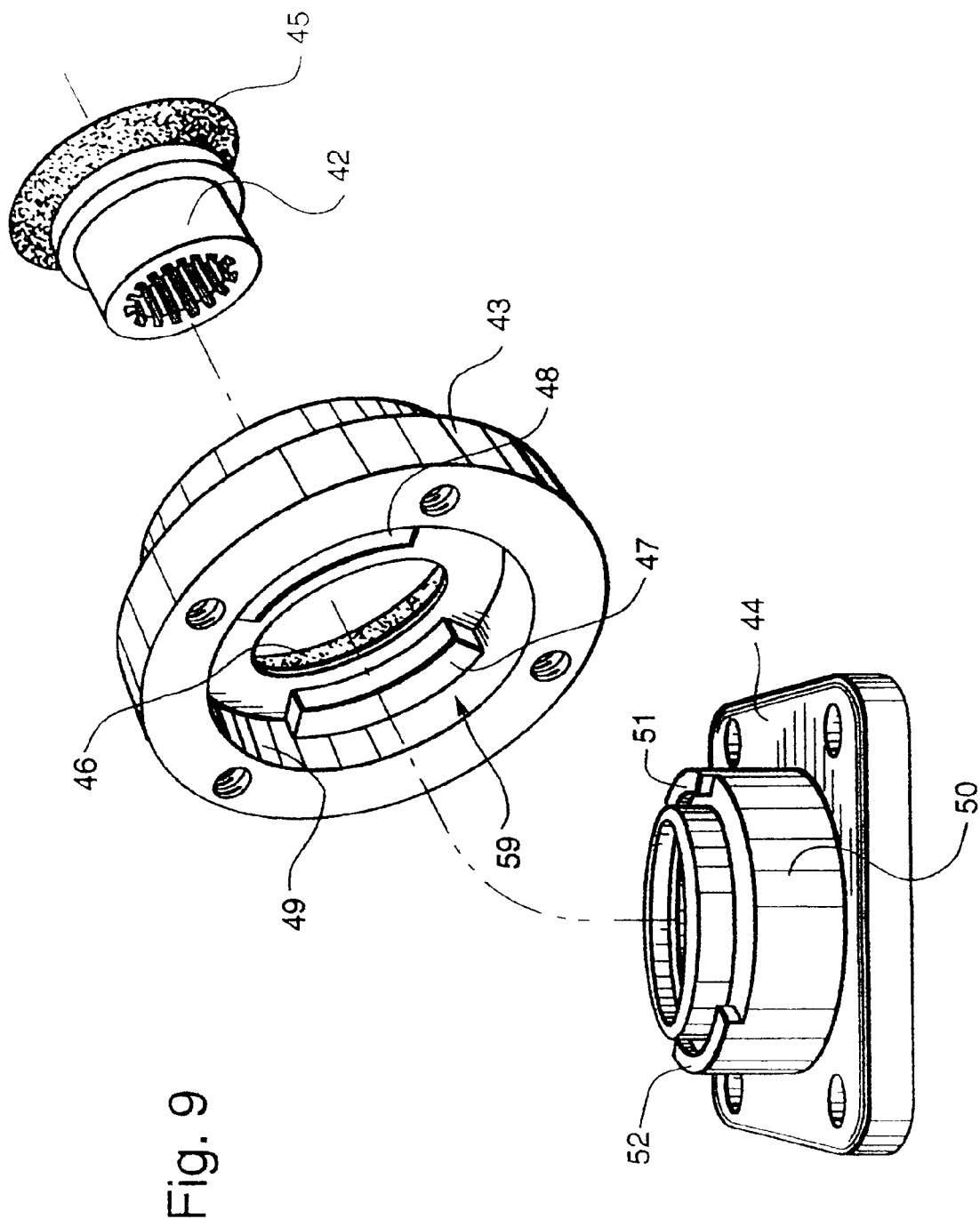
FIG. 9 is an exploded view somewhat rotated showing the relationship between the inner hub, the outer hub and the lower locking block.

Now, and more specifically, attention is directed to FIG. 9 which shows an exploded perspective view of the inner hub 42, the outer hub 43 and the lower locking block 44. In the preferred embodiment, inner hub 42 is affixed to outer hub 43 by means of a layer of epoxy bonding surfaces 45 and 46 of the two hubs, respectively. By controlling the size of the bonded surface area of the two hubs, and knowing the shear strength of the epoxy, a specific shear point or force can be calculated so that failure will occur at the desired point and upon a specific impact. Outer hub 43 includes an upper locking block made up of spaced-apart teeth 47 and 48 set within a circular recess 49. Lower locking block 44 comprises protruding cylindrical member 50 with spaced-apart teeth 51 and 52. When assembled, as best seen in FIG. 4, protruding cylindrical member 50 fits rotatably part way into cylindrical recess 49. Also as best seen in FIG. 4, before failure of the layer 53, cap 56, inner hub 42 and outer hub 43 are fixed to and rotate with drive shaft 86. After failure of layer 53, outer hub 43 is free to rotate about drive shaft 86, at least until the locking blocks engage. When engaged as discussed further below, the teeth on the respective locking blocks loosely fit together to prevent relative rotational movement between the two locking blocks.

Surfaces 45 and 46 may have generally any configuration or slope, so long as the outer hub can move into the locking position upon failure of layer 53. The configuration shown has proven to be quite successful and functional.

One of skill in the art will recognize that there are many types of epoxy available that will work in this environment. By way of example, successful operation has been experienced with an epoxy known as "HP-120" by Loctite®. A useful characteristic of epoxy is that only a very thin layer is required to hold the hubs together, and when it fails, the material all but disappears. This feature is quite valuable and important from a practical point of view in that the cleanliness of shear failure promotes quick operation of the brake. Devices such as that shown in the '662 patent listed above would, upon failure of the shear device, present metallic debris that would likely interfere with, and "jam" up the brake disclosed herein.

While epoxy is disclosed as the preferred bonding or shear medium, there are other alternatives. For example, rubber, plastic, solder, brazing and the like could all be used. It is worthwhile to note that in the environment of a cutterhead, mechanical shear pins or similar fitted shear mechanisms tend to fail prematurely due to the fatigue experienced from the vibration and alternating stress inherent in the application.

Figure 6:
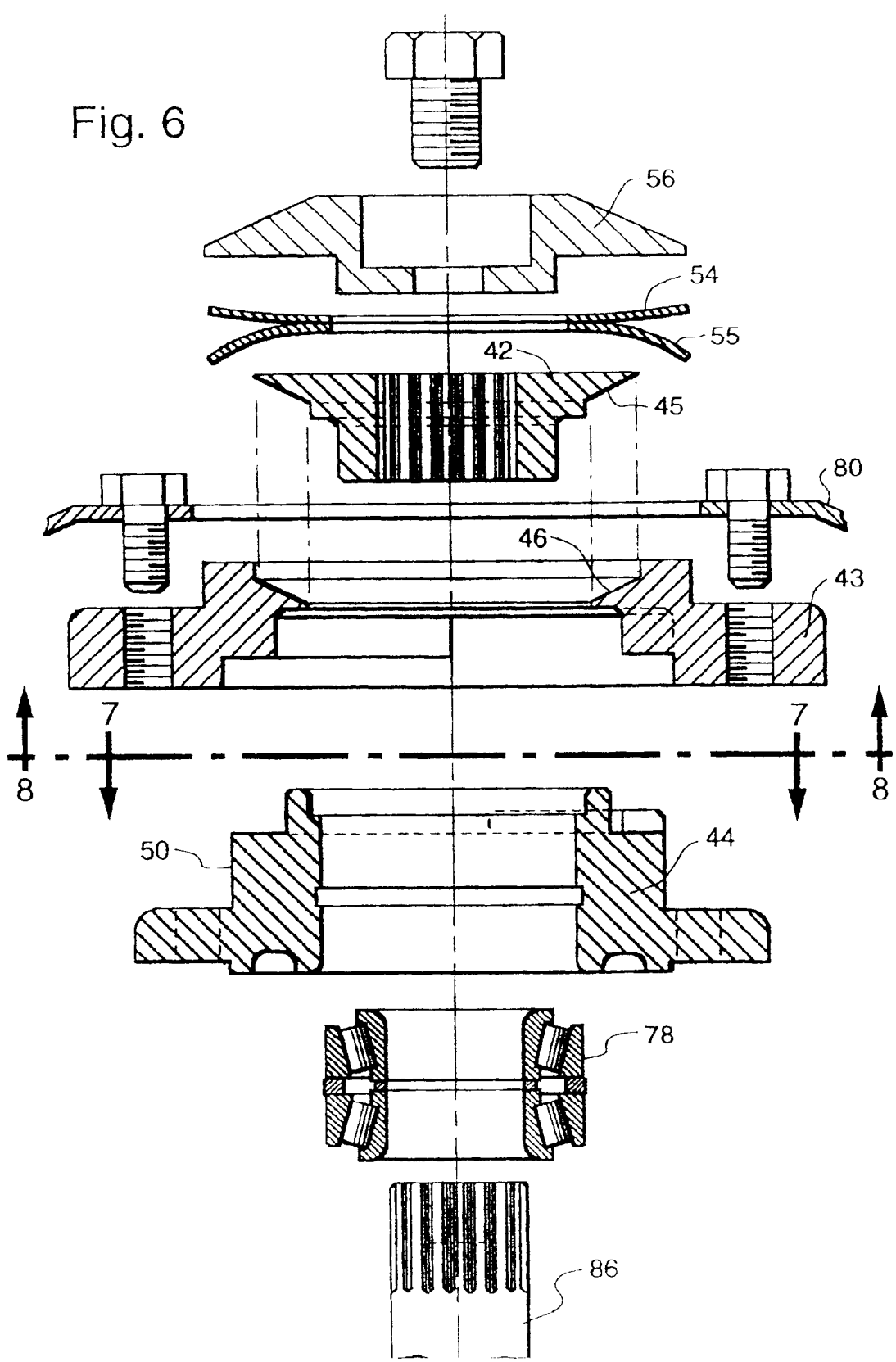
FIG. 6 is an exploded cross-sectional view of the hubs, locking blocks and springs making up significant components of the invention shown previous figures.

FIG. 6 is an exploded cross-sectional view of the primary elements making up the preferred embodiment of the invention and is included herein for further clarity. The Belleville washers (springs) 54 and 55 are mounted in an opposing manner and shown here in their compressed state, but it can be clearly seen that when assembled the washers will exert a downward bias on outer hub 43. Thus, if the epoxy bond 53 between the inner and outer hubs 42, 43 is broken, outer hub 43 will be biased to move downwardly.

Figure 7:
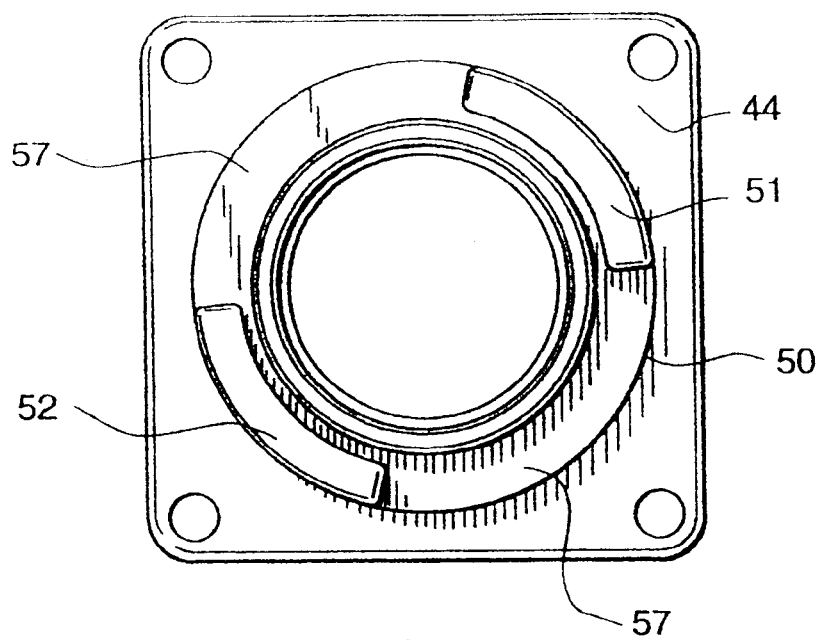
FIG. 7 is a top plan view of the lower locking block taken along line 7—7 of FIG. 6.
Figure 8:
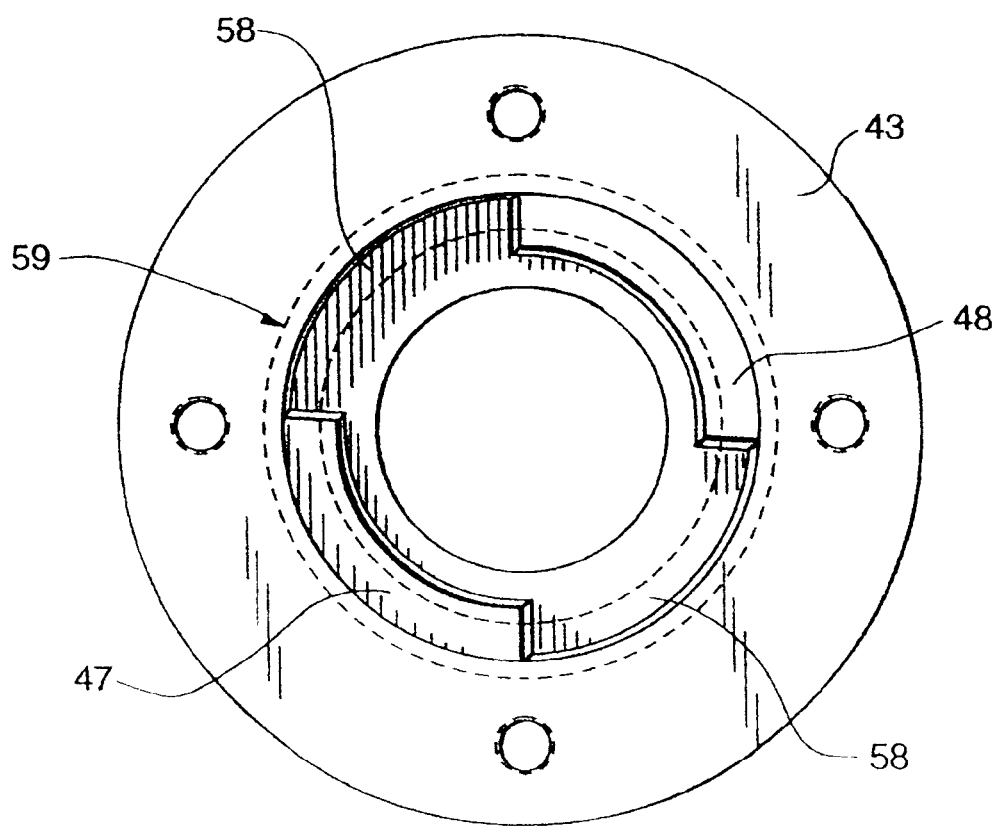
FIG. 8 is a bottom plan view of the outer hub and integral upper locking block taken along line 8—8 of FIG. 6.

FIGS. 7 and 8 are also presented for additional clarity. FIG. 7 is a top plan view of lower locking block 44 taken along line 7—7 of FIG. 6. Looking at this view and FIG. 9 it can be seen that there are raised areas, or teeth, 51 and 52 extending partially around the circumference of the protruding cylindrically shaped portion 50, forming lower interstitial areas 57. FIG. 8 shows that outer hub 43 includes a portion 59 which is referred to as the upper locking block. Upper locking block 59 can be either integral with outer hub 43, as shown here, or formed as a separate piece and affixed to outer hub 43. Teeth 47 and 48 are spaced apart, forming lower interstitial areas 58. Interstitial areas 57 and 58 are larger circumferentially than the respective teeth that are to be engaged therein. This difference in size is to allow time and space for the full engagement of the locking blocks upon failure of the shear layer. When assembled, the teeth of the two locking blocks are separated; however, if the shear mechanism fractures, i.e., the epoxy bond fails, outer hub 43 (and because they are integral, upper locking hub 59) drops into lower locking block 44—teeth 51 and 52 drop into spaces 58, and teeth 47 and 48 go into spaces 57. The two locking blocks are thus "locked" together, stopping the rotation of outer hub 43 (and thus disc member 80 and knives 82). Lower locking block 44 is fixed in place, i.e., does not rotate and thus provides solid support for the locking function.

The number and configuration of teeth on the locking blocks can, of course, vary depending upon several factors such as the hardness of the base materials, the speed of rotation, the mass of the cutterhead, and the timing required to stop the relative movement of the components. In addition, for similar reasons, it may be appropriate or beneficial to harden the teeth, add cushioning material to the interfering faces and/or add friction-reducing materials to the contacting surfaces.

Figure 5:
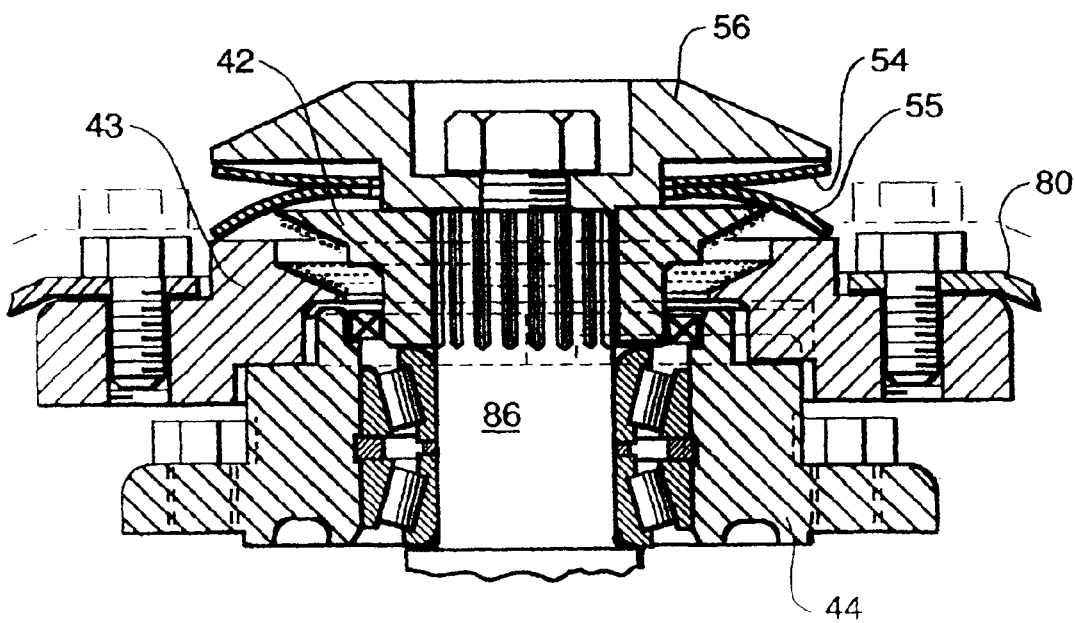
FIG. 5 is a view similar to FIG. 4, showing an exaggerated view of the gap separating inner hub 42 and outer hub 43 after the shear mechanism has failed and the locking blocks have engaged.

Referring now to FIGS. 3–5, inner hub 42 is detachably splined onto a drive shaft 86 having an integral driven gear 77 positioned within the oil reservoir 84. Inner hub 42 is affixed to outer hub 43 by a layer of epoxy 53 which, as described above, serves as a shearing device. A disc member 80 is detachably connected to outer hub 43 by bolts 81 so as to be rotatable therewith (and thus knives 82). The drive shaft 86 is rotatably supported by a bearing block 78 detachably mounted to the cutterhead module housing 41 by bolts 79. The bearing block 78 seals an opening in the top of the housing 41 through which the driven gear can be extracted from the oil reservoir 84.

When the cutterhead engages a fixed object of sufficient mass or rigidity to generate a shearing force on layer 53, adequate to cause failure thereof, the inner and outer hubs 42, 43 will separate and outer hub 43 will drop. In the preferred embodiment, outer hub 43 is biased downwardly by means such as Belleville washers 54 and 55 working between cap 56 and outer hub 43. FIG. 5 shows this change in position of outer hub 43 (has moved downwardly on shaft 86) in exaggerated form for illustrative purposes.

The drive mechanism 75 in each cutterhead module 40 is coupled to the other cutterhead module drive assemblies 85 by a transfer shaft 94 that passes through the spacer module 32, as best depicted in FIG. 2. The transfer shaft 94 is splined at each opposing end thereof to be finally received within either of the adjacent hubs to transfer rotational power thereto.

Referring now to the configurations of utilization of the cutterbar 30 as depicted in FIG. 1, it can be seen that the drive mechanism 75 in a disc mower 10 receives rotational power from a gearbox 17 that is supported adjacent the inboardmost cutterhead module 40. Accordingly, the drive assembly 85 is connected directly to the output shaft (not shown) of the gearbox 17. The transfer of rotational power to the remaining cutterhead modules 40 proceeds as described above.

Figure 10:
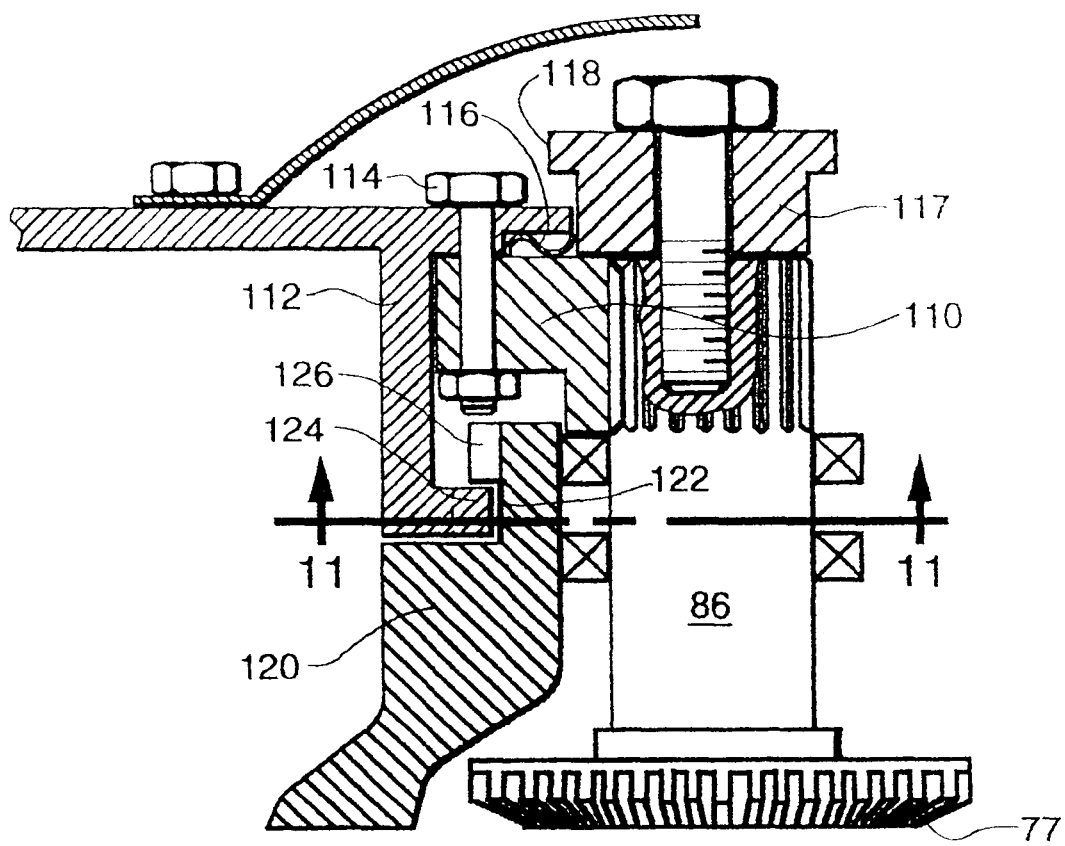
FIG. 10 is a cross-sectional view of an alternative embodiment of the brake device taken along line 10—10 of FIG. 11.
Figure 11:
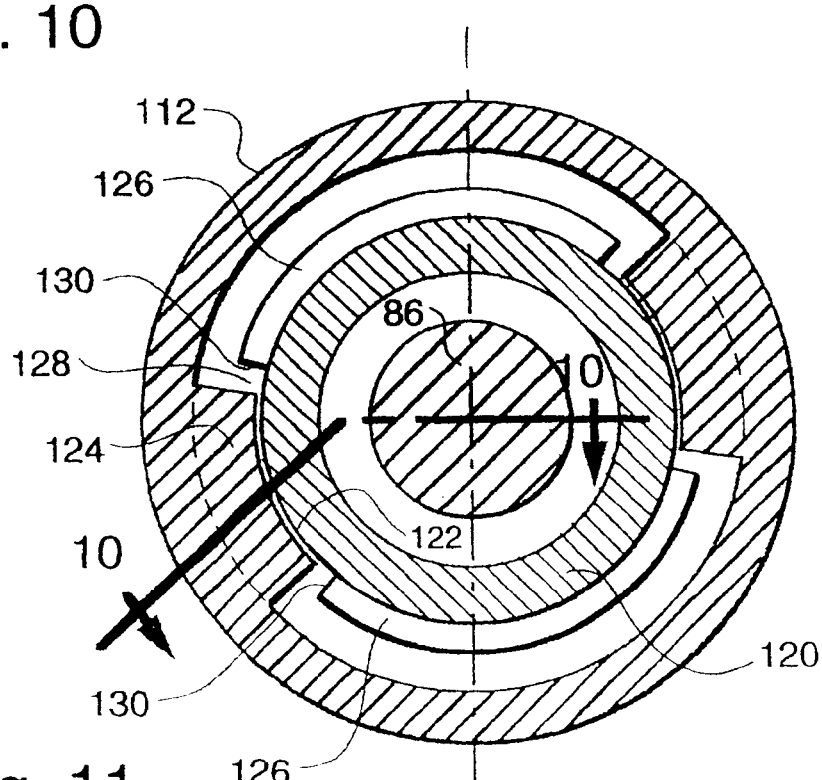
FIG. 11 is a view of an alternative locking block taken along line 11—11 of FIG. 10.
Figure 12:
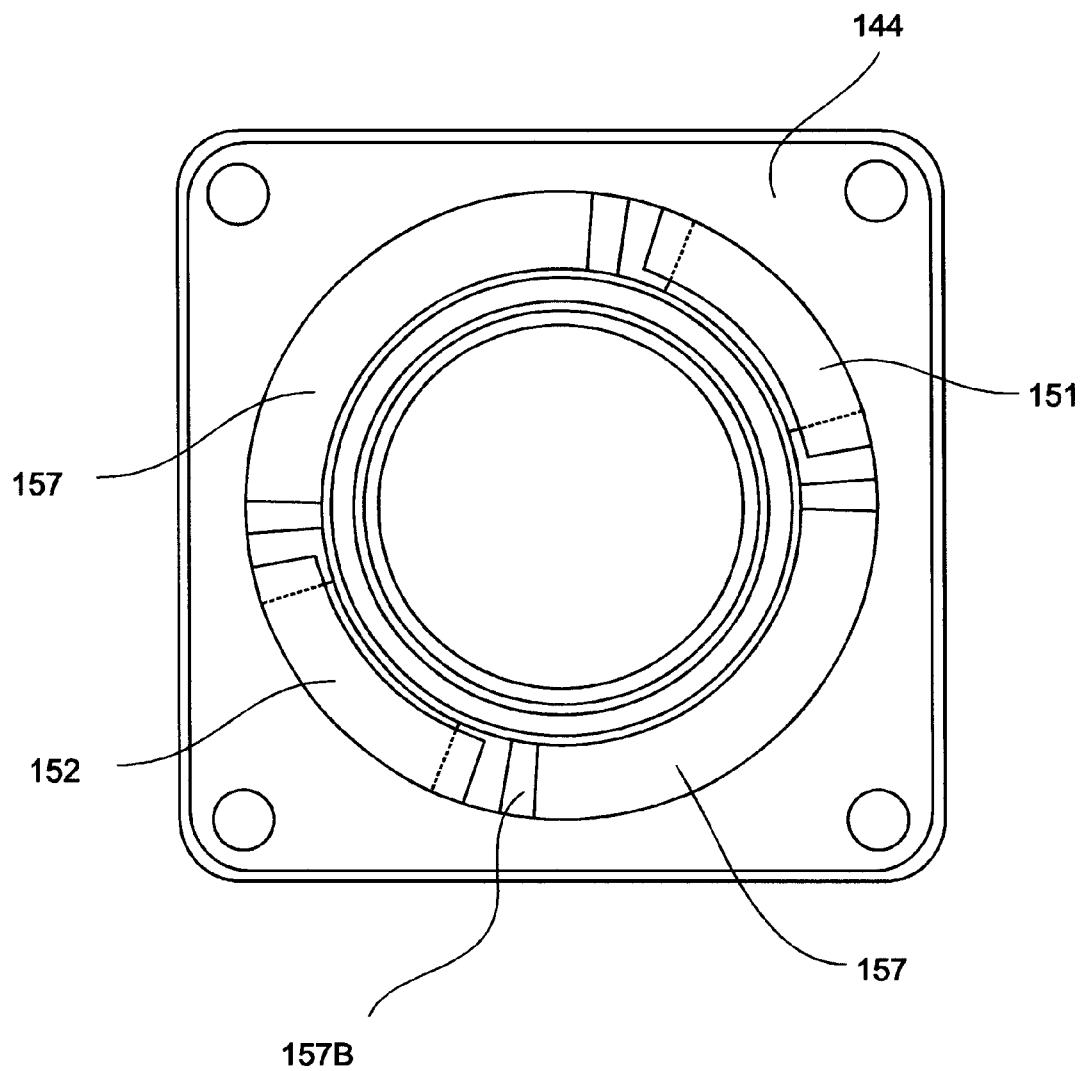
FIG. 12 is a top plan view of the lower locking block of the instant invention, similar to that shown in FIG. 7.
Figure 13:
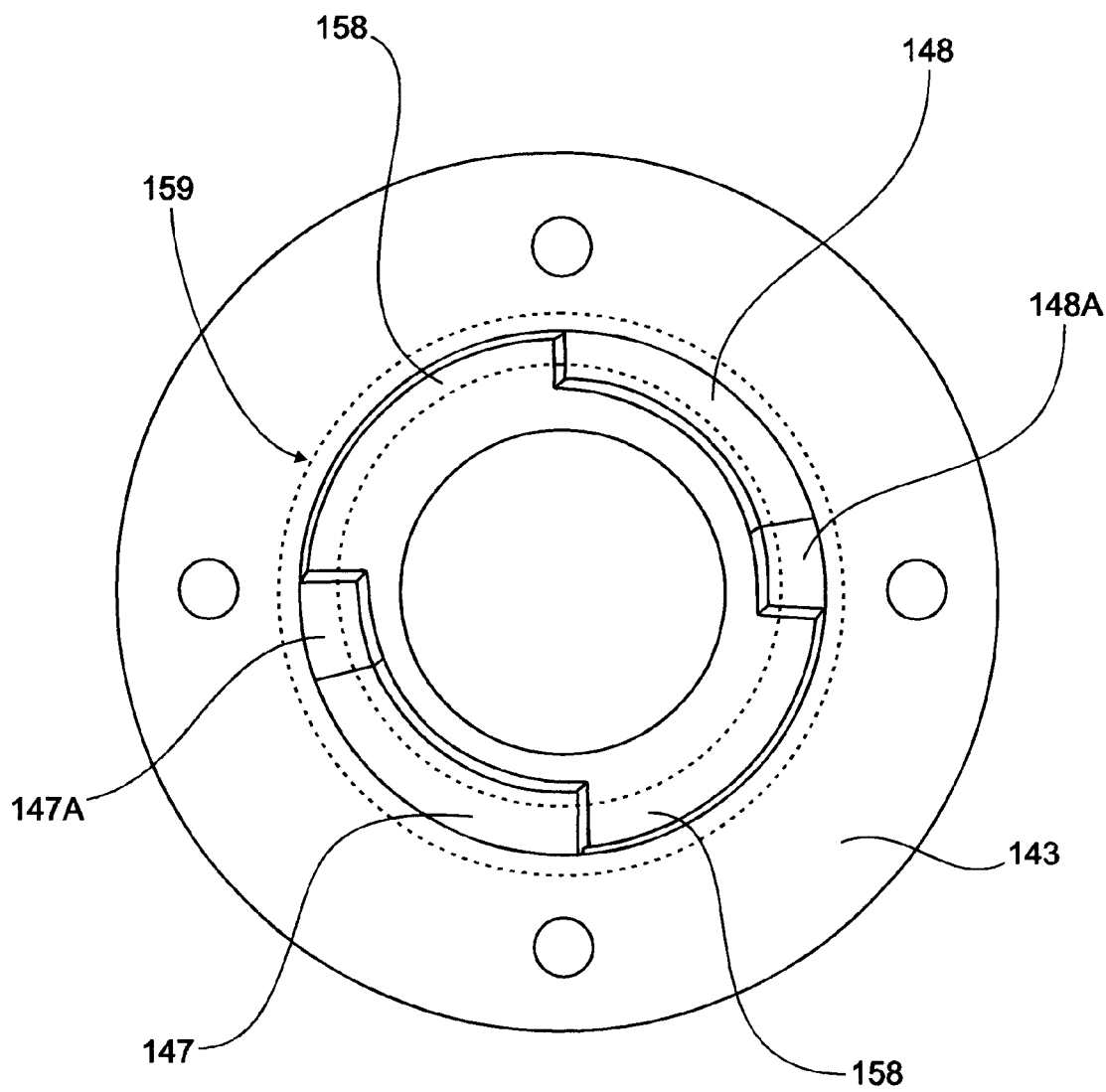
FIG. 13 is a bottom plan view, similar to FIG. 8, of the outer hub and integral upper locking block of the instant invention.

FIGS. 10 and 11 show an important alternative structure to the brake. In the brake described above, the outer hub drops down to allow the locking blocks to engage. A potential problem with this arrangement is that crop materials and debris can build up on the lower part of the structure and potentially hinder or interfere with the quick engagement of the brake. While one could take steps and develop structure to reduce or prevent the build up of materials, the structure shown in FIGS. 10 and 11 eliminates the potential problem by causing the outer hub to move upward on the drive shaft 86 to engage the brake.

Inner hub 110 is connected to outer hub 112 by shear bolt 114. Of course, instead of a shear bolt(s) a frangible layer as taught above could also be used as the shear device. Between the inner hub 110 and outer hub 112 is a spring 116, in this embodiment a known wave spring, biasing the outer hub 112 upwardly relative to inner hub 110 that is fixed to shaft 86 by, for example, splines. Annular lip 118 on cap 117 forms a stop against further upward movement of inner hub 110. Thus, upon failure of the shear device, outer hub 112 moves upwardly away from inner hub 110 under the bias of spring 116 until it engages lip 118 of cap 117.

Though the interlocking configuration of the locking blocks could be essentially the same as that described and shown in earlier figures, this embodiment shows a slight modification. Lower locking block 120 has an annular recess 122 into which flange 124 of outer hub 112 fits. As best seen in FIG. 11, lower locking block 120 has spaced-apart annular lips 126 forming annular openings 128 which matingly match teeth (not shown) on flange 124 such that the teeth mate with openings 128 to lock outer hub 112, when the shear device fails, in the manner described above. The dimensional relationship among the component parts is such that lip 118 stops upward movement of outer hub 112 at the same time the teeth on flange 124 move into openings 128 and engage the edges 130 of openings 128.

Figure 14:
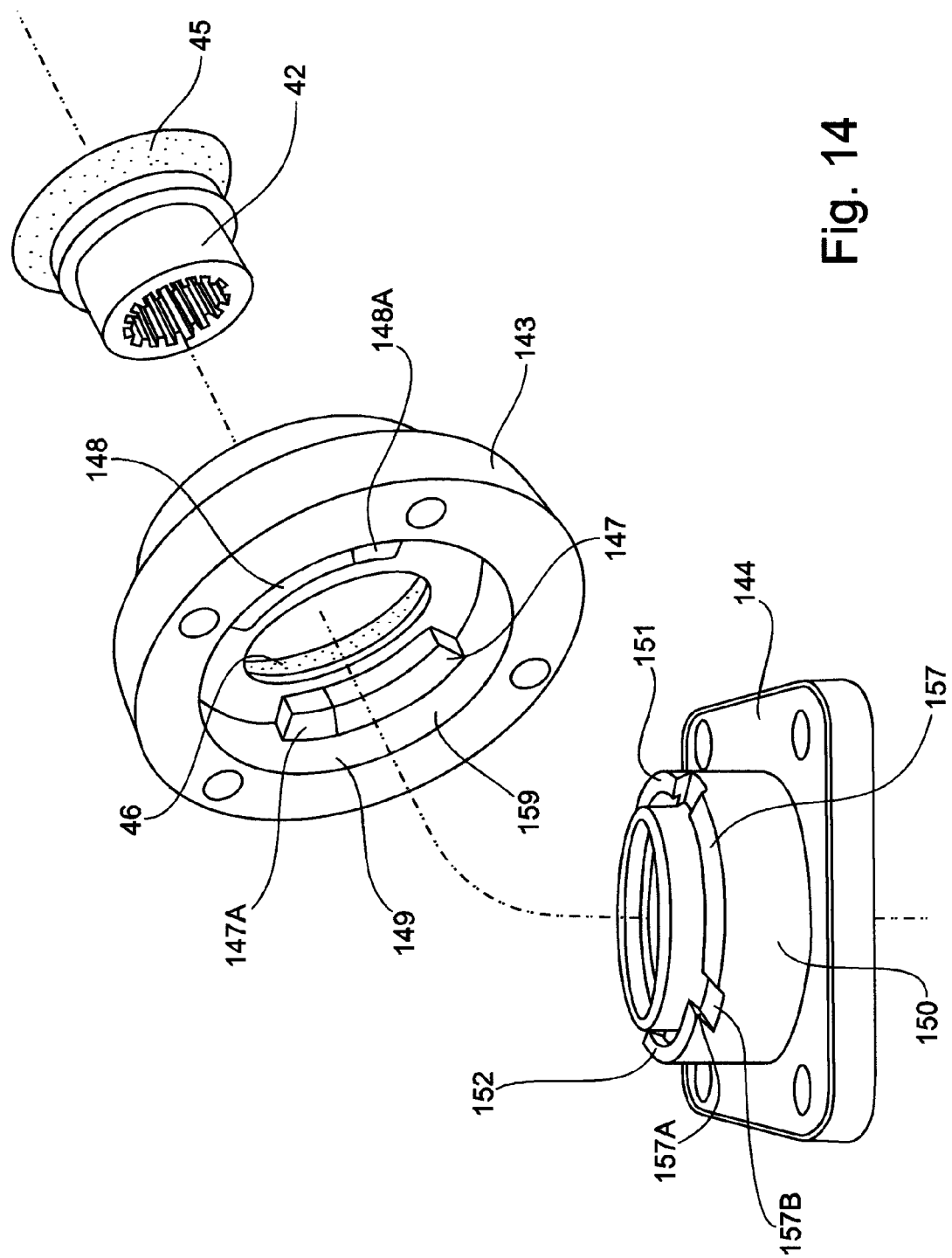
FIG. 14 is an exploded view, similar to FIG. 9, somewhat rotated showing the relationship between the inner hub, the outer hub and the lower locking block of the instant invention.

The instant invention is, as stated above, an improvement in the design of the braking device, i.e., the outer hub 143 and the lower locking block 144. The objective here is to prevent permanent damage to the locking mechanism due to excessive shear force, and to prevent damage to the cutterbar. Attention is directed to the improvements of the instant invention as shown in FIG. 14, an exploded perspective view of the inner hub 42, the outer hub 143 and the lower locking block 144. In the preferred embodiment of the instant invention, inner hub 42 is affixed to outer hub 143 by means of a layer of epoxy bonding surfaces 45 and 46 of the two hubs, respectively. By controlling the size of the bonded surface area of the two hubs, and knowing the shear strength of the epoxy, a specific shear point or force can be calculated so that failure will occur at the desired point and upon a specific impact. Outer hub 143 includes an upper locking block made up of spaced-apart teeth 147 and 148 set within a circular recess 149. Each of the teeth 147 and 148 has an energy absorbing end portion, 147A and 148A, respectively, affixed thereto. The material of which the energy absorbing portion is made may be any suitable material, such as, for example, a 50% lead and 50% tin, and may be in any suitable mixture, such as solder. The important selection criteria for the energy absorbing material is that it is softer than the parent material of the disc and locking blocks.

Lower locking block 144 comprises protruding cylindrical member 150 with spaced-apart teeth 151 and 152. When assembled, as best understood by viewing FIG. 4 (and substituting the modifications of the instant invention), protruding cylindrical member 150 fits rotatably part way into cylindrical recess 149. Also as best seen in FIG. 4, before failure of the layer 53, cap 56, inner hub 42 and outer hub 143 are fixed to and rotate with drive shaft 86. The interstitial spaces 157 between teeth 151 and 152 in lower locking block 144 include, adjacent the interface between the respective teeth and interstitial spaces, a 45° angle 157A and a cavity 157B. After failure of layer 53, outer hub 143 is free to rotate about drive shaft 86, at least until the locking blocks engage. When engaged, the teeth on the respective locking blocks drop into engagement to prevent relative rotational movement between the two locking blocks. As the respective teeth on the two locking blocks engage, the rotational force causes the energy absorbing material to deform. The energy absorbing material absorbs the kinetic energy of the rotating disc cutterhead. This decelerates the rotating disc to a slower rate, reducing the peak shear force applied to the locking blocks and eliminating damage to the structure. The angled surface 157A forces the outer hub downward as the energy absorbing material is forced into the cavity 157B, resulting in a more positive engagement of the locking blocks. Since the energy absorbing material is forced into the cavity it prevents the outer hub (and, thus, the disc cutterhead) from rotating backwards. This keeps the disc cutterhead locked into a safe position and prevents it from being struck by the adjacent disc cutterheads.

The number and configuration of teeth on the locking blocks can, of course, vary depending upon several factors such as the hardness of the base materials, the speed of rotation, the mass of the cutterhead, and the timing required to stop the relative movement of the components. In addition, for similar reasons, it may be appropriate or beneficial to harden the teeth, add cushioning material to the interfering faces and/or add friction-reducing materials to the contacting surfaces.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A disc cutterbar having a support member with a cutterhead affixed thereto, said cutterhead including:
   a disc member carrying a knife to sever standing crop material, said disc member drivingly connected to a mounting hub provided with a central mounting hole;
   a drive system including a drive shaft coaxially affixed in said mounting hole for rotation of said disc member about a generally upright axis;
   a shear device operable between said drive shaft and said disc member such that torque is transferred from said drive shaft through said mounting hub and shear device to said disc member;
   a brake including an upper locking block on the bottom of said mounting hub and a lower locking block non-rotatably connected to said support member, said upper and lower locking blocks being coaxial with said drive shaft and spaced apart from each other along the axis of said drive shaft;
   said drive shaft extending through said mounting hub and said upper and lower locking blocks, said upper locking block movable along said drive shaft upon failure of said shear device; and
   said upper and lower locking blocks including generally mating teeth, said teeth on said upper locking block having a shock absorbing section positioned to contact said teeth on said lower locking block upon failure of said shear device, whereby failure of said shear device allows said mounting hub to move on said drive shaft toward said lower locking block and said teeth on said upper and lower locking block engage, stopping rotation of said mounting hub.

2. The disc cutterbar of claim 1 wherein:
said teeth on said locking blocks are formed as spaced-apart elongate sections of a ring, the respective sections on said upper locking block fitting in the interstitial spaces between the spaced-apart sections on said lower locking block upon failure of said shear device.

3. The disc cutterbar of claim 2 wherein:
said teeth on said upper and lower locking blocks are generally rectangular in vertical cross-section.

4. The disc cutterbar of claim 3 wherein:
each said tooth on said upper locking block has a leading end on the end thereof leading during rotation of said disc; and
said leading end is made of a shock absorbing material softer than the material of which the remainder of said upper locking block is made.

5. The disc cutterbar of claim 4 wherein:
each said tooth on said lower locking block has a trailing end on the end thereof trailing during rotation of said disc; and
said trailing end is undercut at an angle of approximately 45° and a cavity is cut below the surface of the interstitial spaces between said teeth on said lower locking block whereby, upon failure of said shear device, said leading ends of said teeth on said upper locking block contact said trailing ends of said teeth on said lower locking block and said shock absorbing material deforms into said cavity.

6. The disc cutterbar of claim 5 wherein:
said mounting hub and locking blocks are held in position on said drive shaft by a cap member affixed to said drive shaft; and
said upper locking block is biased toward said lower locking block by a compression spring operating between said cap member and said upper locking block.

7. The disc cutterbar of claim 6 wherein:
said spring is a pair of opposing Belleville washers fitted on said drive shaft.

8. The disc cutterbar of claim 7 wherein:
said brake stops the rotation of said disc member in one revolution or less of said disc member after failure of said shear device.

9. A disc cutterbar comprising:
a support member;
a cutterhead affixed to said support member, said cutterhead including:
   a disc member carrying a knife to sever standing crop material, said disc member drivingly connected to a mounting hub provided with a central mounting hole;
   a drive system including a drive shaft coaxially affixed in said mounting hole for rotation of said disc member about a generally upright axis;

a shear device operable between said drive shaft and said disc member such that torque is transferred from said drive shaft through said mounting hub and shear device to said disc member;

a brake including an upper locking block on the bottom of said mounting hub and a lower locking block non-rotatably connected to said support member, said upper and lower locking blocks being coaxial with said drive shaft and spaced apart from each other along the axis of said drive sh said drive shaft extending through said mounting hub and said upper and lower locking blocks, said upper locking block movable along said drive shaft upon failure of said shear device; and said upper and lower locking blocks including generally mating teeth, said teeth on said upper locking block having a shock absorbing section positioned to contact said teeth on said lower locking block upon failure of said shear device, whereby failure of said shear device allows said mounting hub to move on said drive shaft toward said lower locking block and said teeth on said upper and lower locking block engage, stopping rotation of said mounting hub.

10. The disc cutterbar of claim 9 wherein:

said teeth on said locking blocks are formed as spaced-apart elongate sections of a ring, the respective sections on said upper locking block fitting in the interstitial spaces between the spaced-apart sections on said lower locking block upon failure of said shear device; and said teeth on said upper and lower locking blocks are generally rectangular in vertical cross-section.

11. The disc cutterbar of claim 10 wherein:

each said tooth on said upper locking block has a leading end on the end thereof leading during rotation of said disc; and said leading end is made of a shock absorbing material softer than the material of which the remainder of said upper locking block is made.

12. The disc cutterbar of claim 11 wherein:

each said tooth on said lower locking block has a trailing end on the end thereof trailing during rotation of said disc; and said trailing end is undercut at an angle of approximately 45° and a cavity is cut below the surface of the interstitial spaces between said teeth on said lower locking block whereby, upon failure of said shear device, said leading ends of said teeth on said upper locking block contact said trailing ends of said teeth on said lower locking block and said shock absorbing material deforms into said cavity.

13. The disc cutterbar of claim 5 wherein:

said mounting hub and locking blocks are held in position on said drive shaft by a cap member affixed to said drive shaft; and said upper locking block is biased toward said lower locking block by a pair of opposing Belleville washers fitted on said drive shaft and operating between said cap member and said upper locking block.

14. In a disc cutterbar having a support member with a cutterhead affixed thereto, the improvement comprising:

a disc member carrying a knife to sever standing crop material, said disc member drivingly connected to a mounting hub provided with a central mounting hole;

a drive system including a drive shaft coaxially affixed in said mounting hole for rotation of said disc member about a generally upright axis;

a shear device operable between said drive shaft and said disc member such that torque is transferred from said drive shaft through said mounting hub and shear device to said disc member;

a brake including an upper locking block on the bottom of said mounting hub and a lower locking block non-rotatably connected to said support member, said upper and lower locking blocks being coaxial with said drive shaft and spaced apart from each other along the axis of said drive shaft;

said drive shaft extending through said mounting hub and said upper and lower locking blocks, said upper locking block movable along said drive shaft upon failure of said shear device; and said upper and lower locking blocks including generally mating teeth, said teeth on said upper locking block having a shock absorbing section positioned to contact said teeth on said lower locking block upon failure of said shear device, whereby failure of said shear device allows said mounting hub to move on said drive shaft toward said lower locking block and said teeth on said upper and lower locking block engage, stopping rotation of said mounting hub.

15. The disc cutterbar of claim 14 wherein:

said teeth on said locking blocks are formed as spaced-apart elongate sections of a ring, the respective sections on said upper locking block fitting in the interstitial spaces between the spaced-apart sections on said lower locking block upon failure of said shear device.

16. The disc cutterbar of claim 15 wherein:

said teeth on said upper and lower locking blocks are generally rectangular in vertical cross-section.

17. The disc cutterbar of claim 16 wherein:

each said tooth on said upper locking block has a leading end on the end thereof leading during rotation of said disc; and said leading end is made of a shock absorbing material softer than the material of which the remainder of said upper locking block is made.

18. The disc cutterbar of claim 17 wherein:

each said tooth on said lower locking block has a trailing end on the end thereof trailing during rotation of said disc; and said trailing end is undercut at an angle of approximately 45° and a cavity is cut below the surface of the interstitial spaces between said teeth on said lower locking block whereby, upon failure of said shear device, said leading ends of said teeth on said upper locking block contact said trailing ends of said teeth on said lower locking block and said shock absorbing material deforms into said cavity.

19. The disc cutterbar of claim 18 wherein:

said mounting hub and locking blocks are held in position on said drive shaft by a cap member affixed to said drive shaft; and said upper locking block is biased toward said lower locking block by a pair of opposing Belleville washers fitted on said drive shaft and operating between said cap member and said upper locking block.

20. The disc cutterbar of claim 19 wherein:

said brake stops the rotation of said disc member in one revolution or less of said disc member after failure of said shear device.

* * * * *

UNITED STATES PATENT AND TRADEMARK OFFICE
CERTIFICATE OF CORRECTION

PATENT NO.   : 6,604,347 B2
DATED        : August 12, 2003
INVENTOR(S)  : Edward H. Priepke, Imants Ekis and Timothy J. Kraus It is certified that error appears in the above-identified patent and that said Letters Patent is hereby corrected as shown below:

<u>Title page,</u>
Item [75], the name of the first inventor should be -- Edward H. Priepke --.

Signed and Sealed this

Twenty-fifth Day of November, 2003

JAMES E. ROGAN
*Director of the United States Patent and Trademark Office*